(12) United States Patent
Saito et al.

(10) Patent No.: US 11,801,712 B2
(45) Date of Patent: Oct. 31, 2023

(54) CASTER SWIVEL RESTRICTION STRUCTURE

(71) Applicant: NANSIN CO., LTD., Tokyo (JP)

(72) Inventors: Akinori Saito, Tokyo (JP); Nao Kanamori, Inzai (JP)

(73) Assignee: NANSIN CO., LTD., Tokyo (JP)

( * ) Notice: Subject to any disclaimer, the term of this patent is extended or adjusted under 35 U.S.C. 154(b) by 735 days.

(21) Appl. No.: 16/604,433

(22) PCT Filed: Apr. 10, 2017

(86) PCT No.: PCT/JP2017/014732
§ 371 (c)(1),
(2) Date: Feb. 6, 2020

(87) PCT Pub. No.: WO2018/189799
PCT Pub. Date: Oct. 18, 2018

(65) Prior Publication Data
US 2022/0227171 A1   Jul. 21, 2022

(51) Int. Cl.
*B60B 33/02* (2006.01)
(52) U.S. Cl.
CPC .................... *B60B 33/02* (2013.01)
(58) Field of Classification Search
CPC ..... B60B 33/02; B60B 33/021; B60B 33/023; B60B 33/025
See application file for complete search history.

(56) References Cited

U.S. PATENT DOCUMENTS

| | | | | |
|---|---|---|---|---|
| 3,890,669 A | * | 6/1975 | Reinhards | B60B 33/021 188/1.11 R |
| 5,014,391 A | * | 5/1991 | Schulte | B60B 33/021 16/35 R |
| 7,210,690 B2 | * | 5/2007 | Tan | B62B 7/04 280/47.38 |
| 7,406,745 B1 | * | 8/2008 | Chou | B60B 33/026 16/35 R |

(Continued)

FOREIGN PATENT DOCUMENTS

WO   2015/118672 A1   8/2015

OTHER PUBLICATIONS

International Search Report dated Jun. 20, 2017, issued in counterpart International Application No. PCT/JP2017/014732, with English Translation. (2 pages).

(Continued)

*Primary Examiner* — Jeffrey O'Brien
(74) *Attorney, Agent, or Firm* — WHDA, LLP

(57) ABSTRACT

The present invention relates to an improvement in caster swivel restriction structure. The present invention is characterized in that a swivel brake plate has a body piece having a plurality of through holes arranged therein and latch pieces bent downward from the body piece, a support base has latch hole portions for fitting the latch pieces in a vertical slidable manner, a gap portion provided at a location corresponding to below the group of through holes formed in the swivel brake plate, and cushioning members or biasing members which are disposed in the gap portion and supports the swivel brake plate aloft and which is repulsively compressed when downward force is applied to the swivel brake plate.

7 Claims, 6 Drawing Sheets

(56) References Cited

U.S. PATENT DOCUMENTS

| | | | | |
|---|---|---|---|---|
| 7,506,404 | B2* | 3/2009 | Block | B60B 33/0092 16/35 R |
| 7,810,613 | B2* | 10/2010 | Lin | B60B 33/0068 188/69 |
| 8,850,657 | B1* | 10/2014 | Yang | B60B 33/0057 16/35 R |
| 9,038,786 | B2* | 5/2015 | Lin | B60B 33/0086 188/1.12 |
| 2008/0092329 | A1* | 4/2008 | Chou | B60B 33/026 16/45 |
| 2009/0139804 | A1* | 6/2009 | Lin | B60B 33/025 188/1.12 |
| 2010/0107360 | A1* | 5/2010 | Shih | B60B 33/0073 16/21 |
| 2012/0255141 | A1* | 10/2012 | Lin | B60B 33/025 16/45 |

OTHER PUBLICATIONS

Written Opinion of the International Searching Authority (Form PCT/ISA/237) dated Jun. 20, 2017, issued in counterpart International Application No. PCT/JP2017/014732 (5 pages).

* cited by examiner (a)

(b)

CASTER SWIVEL RESTRICTION STRUCTURE

TECHNICAL FIELD

The present invention relates to an improvement in a structure which restricts swiveling of caster wheels.

BACKGROUND ART

In a swiveling type caster having a wheel swiveling around a main shaft, as disclosed in, e.g., WO2015/118672, a structure in which an anti-swivel plate portion fixed to a lower end of an operation shaft which abuts against a cam surface of a cam rotatably incorporated in an upper portion of a stem and moves up and down is combined with an engagement member which is fixed to a support yoke pivotally supporting the wheel and engages with the anti-swivel plate portion to restrict swiveling has been known as a structure which restricts the swiveling.

Here, the anti-swivel plate portion has many identically shaped convex portions annularly arranged on a lower surface of a discoid base at equal intervals along an outer periphery, and the engagement member is formed of a concave receiving portion which constrains the support yoke so that it does not move in a circumferential direction around the operation shaft when the convex portions are fitted therein.

Here, the receiving portion of the engagement member is integrally provided with the support yoke of the caster and swivels together with the support yoke, and hence its position is not fixed.

On the other hand, the anti-swivel plate portion is fixed to the operation shaft, the operation shaft moves up and down but does not swivel, and hence the convex portions formed on the anti-swivel plate portion are just displaced up and down at fixed positions.

Thus, many convex portions are arranged on the lower surface of the anti-swivel plate portion at equal intervals along an outer peripheral edge.

On the other hand, when left and right (a swiveling direction) sidewalls of the concave portion of the receiving portion are formed into tapered surfaces, applying a load from above enables slightly swiveling the support yoke side and fitting the convex portions in the receiving portion only if the convex portions of the anti-swivel plate portion can abut against the tapered surfaces even though they are not matched with the receiving portion at the time of braking.

However, in case of the above-described structure, there is a problem that the tapered sidewalls must be formed to the receiving portion, machining takes time, a thick metal must be used, and a cost of the material increases.

In recent years, the support yoke side of the caster is made of a synthetic resin, and a structure in which a plurality of concave portions are aligned on a metal plate to configure the engagement receiving portion and the engagement receiving portion is held on a support base made of the synthetic resin has been adopted.

In this case, to strengthen concavo-concave fitting, the concave receiving portion is a through hole formed in a metal plate, and a tip of the convex portion protrudes downward beyond the receiving portion.

Thus, a hollow must be held between the metal plate having the receiving portion provided thereon and the resin support base which supports the metal plate so that a gap portion is formed below the receiving portion.

Further, since fitting each convex portion on the anti-swivel plate portion in any receiving portion of the metal plate can suffice, providing the plurality of receiving portions arranged on the metal plate is effective but, when positions of the convex portion and the receiving portion deviate from each other at the time of swivel braking, a downward load applied due to downward movement of the convex portion of the anti-swivel plate portion is applied to a position between the respective receiving portions, and hence there is a risk that the metal plate downwardly deforms.

CITATION LIST

Patent Literature

Patent Document 1: WO2015/118672

SUMMARY OF INVENTION

Technical Problem

A problem to be solved by the present invention is to provide a caster swivel restriction structure with enhanced durability which cushions a downward load applied due to a downward movement of convex portions on an anti-swivel plate portion and avoids deformation of a metal plate having a receiving portion formed thereon when positions of the convex portions of the anti-swivel plate portion and the receiving portions of the engagement member deviate from each other at the time of swivel braking.

Solution to Problem

According to the present invention, to solve the problem, the present invention is characterized by providing a caster swivel restriction structure including: an operation shaft which moves down at the time of braking a swiveling caster and moves up at the time of releasing the braking; an anti-swivel plate portion which is fixed to the operation shaft and has many convex portions annularly arranged on a lower surface thereof; a swivel brake plate including a plurality of through holes arranged to enable fitting of some of the convex portions; and a support base portion which supports the swivel brake plate and is fixed to a support yoke of the swiveling caster, wherein the swivel brake plate includes a body piece having the plurality of through holes arranged therein and latch pieces which downwardly bend from the body piece, the support base includes latch hole portions into which the latch pieces are vertically slidably fitted and inserted and an upper surface fitting portion provided to face the body piece of the swivel brake plate, and biasing members which support the body piece aloft and are downwardly compressible are interposed between the body piece and the upper surface fitting portion, and a gap portion is provided.

Advantageous Effect of the Present Invention

In the swivel brake plate having the through holes engaging with the convex portions of the anti-swivel plate portion, at the time of disposing the swivel brake plate to the support base configured for attachment to the support yoke, the gap portion is formed between the upper surface fitting portion of the support base and the body piece of the swivel brake plate so that the convex portion tips protrude from the through holes when the convex portions are fitted in the through holes.

Since the biasing members are interposed in this gap portion, cushioning is effected even if the anti-swivel plate portion moves down and downwardly presses the body piece, and the body piece can be prevented from being bent by the gap portion even if the convex portions are not matched with the through holes.

DESCRIPTION OF EMBODIMENTS

According to the present invention, a load applied to a swivel brake plate is cushioned by repulsive biasing members when convex portions are not matched with a receiving portions between the swivel brake plate and a support base at the time of swivel braking, and deformation or damage to the swivel brake plate is avoided to realize durability.

A preferred embodiment of the present invention will now be described hereinafter with reference to the drawings.

Figure 10:
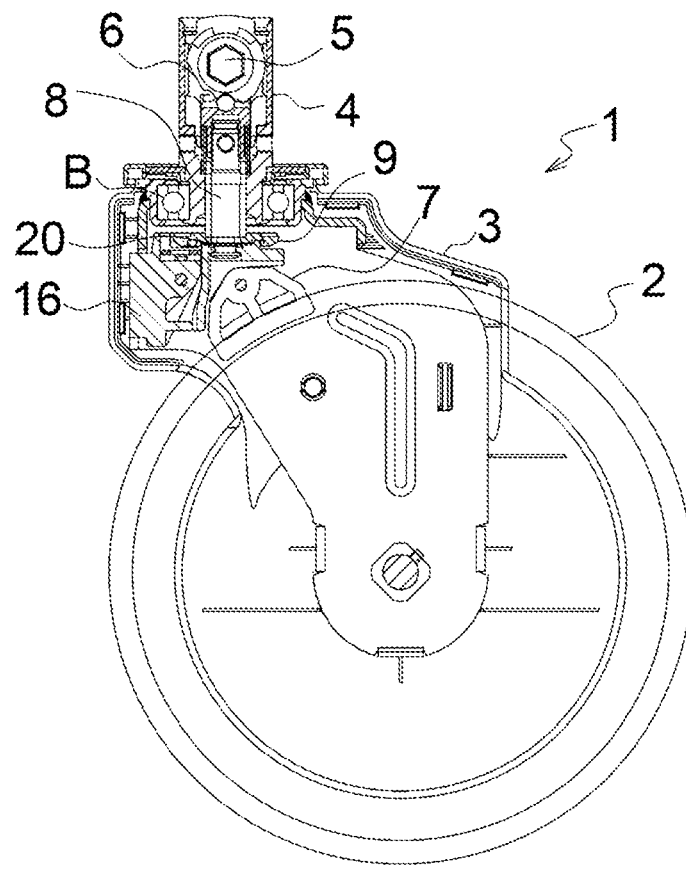
FIG. 10 show an example of a caster having a swivel restriction structure, where (a) is a side elevation and (b) is a longitudinal section view.
Figure 10:
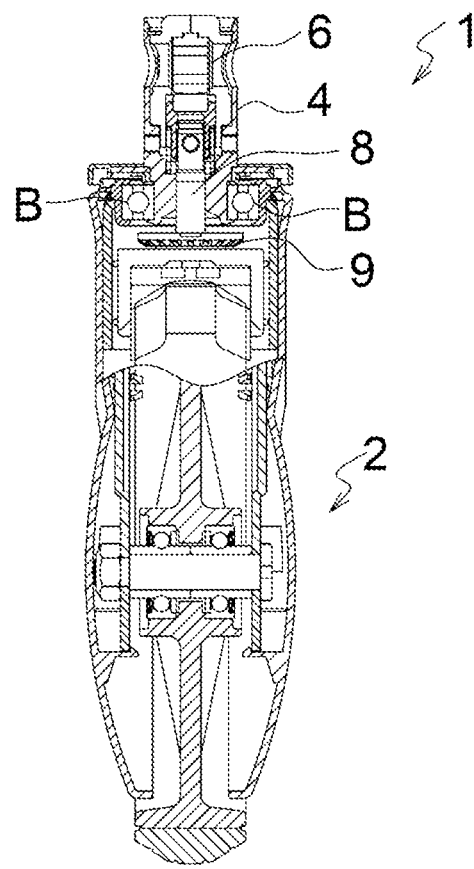

Example 1 a swivel restriction structure according to this example is a swivel restriction structure incorporated in a swiveling type caster 1, a caster structure has an operation shaft 8 which moves down at the time of swivel braking of the swiveling caster and moves up at the time of releasing the braking, an anti-swivel plate portion 9 which is fixed to the operation shaft 8 and has many convex portions 10 annularly arranged on a lower surface thereof, and a metal swivel brake plate 12 having through holes 11 arranged so that some of the convex portions 10 can be fitted therein, and a hard synthetic resin support base portion 16 which supports the swivel brake plate 12 and is fixed to a support yoke 3 of the swiveling caster 1, and any other structures can be applied to a well-known caster (see FIG. 10).

That is, the caster shown in FIG. 10 as an example includes a stem 4 erected on the support yoke 3 pivotally supporting a wheel 2, a cam 6 which is incorporated above the stem 4 and rotated by a rotary shaft 5, a plurality of cam surfaces for braking or braking-canceling formed at predetermined positions on an outer peripheral surface of the cam 6, the operation shaft 8 which abuts against the cam surfaces and slides up and down, the anti-swivel plate portion 9 fixed to a lower end of the operation shaft 8, the swivel brake plate 20 mounted to the support base 16 which is fixed to the support yoke 3 and engages with the anti-swivel plate portion 9 to restrict swiveling of the support yoke 3, and a brake shoe portion 7 which is provided below the anti-swivel plate portion 9 and abuts against a tread surface of the wheel 2 by downward movement of the operation shaft 8 to carry out braking.

In the present invention, the caster structure is not restricted to the above-described structure, and any structure which is disclosed in Japanese Patent No. 5604022 (WO2015/11867) and others and restricts swiveling by the upward or downward movement of the operation shaft 8 can suffice.

Figure 6:
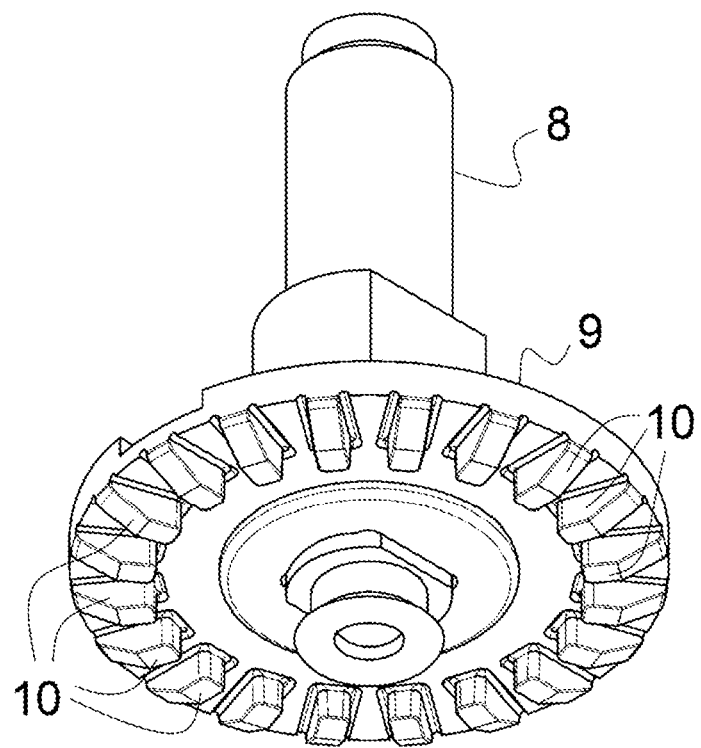
FIG. 6 is a perspective view of an anti-swivel plate portion fixed to an operation shaft.

The anti-swivel plate portion 9 is horizontally fixed to a lower part of the operation shaft 8 which moves down at the time of restricting swiveling (braking may be performed simultaneously with the swiveling restriction) and moves up at the time of releasing the braking (see FIG. 6).

The anti-swivel plate portion 9 has a well-known structure including many convex portions 10 which radially extend and are annularly arranged at equal intervals on a lower surface of a discoid base.

In the illustrated example, each convex portion 10 is formed into an illustrated shape provided by cutting off a tip of a cuboid to form a gradually thinned shape, but a downwardly protruding convex shape can suffice.

The support base 16 which supports the swivel brake plate 20 is fixed to the support yoke 3 which is disposed to the operation shaft 8 through a swivel bearing portion B to enable swiveling and pivotally supports the wheel 2.

Figure 2:
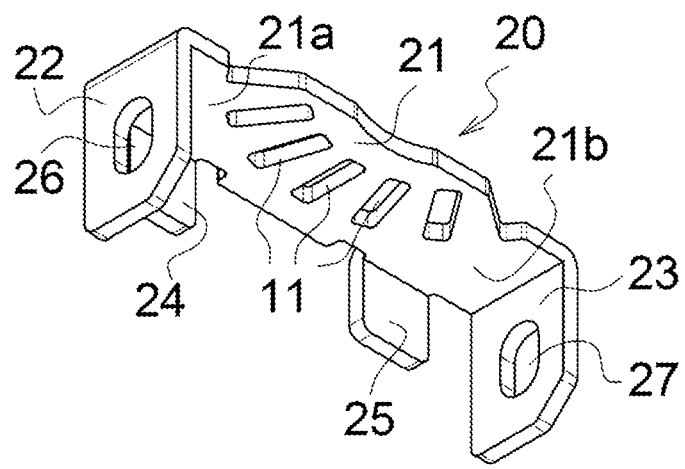
FIG. 2 is a perspective view showing the swivel brake plate from a lower front side.

As clearly shown in FIG. 2, the swivel brake plate 20 has a body piece 21 having a plurality of (five in the illustrated example) through holes arranged therein and latch pieces which bend downward from the body piece 21.

The latch pieces include a pair of left and right first latch pieces 22 and 23 which bend at both ends of the body piece 21 in an extending direction and a pair of second latch pieces 24 and 25 which bend on the right and left of a rear side of the body piece 21 which is a side away from the anti-swivel plate portion 9.

The latch pieces which support the body piece 21 to move up and down in a parallel fashion can suffice, either the first latch pieces 22 and 23 or the second latch pieces 24 and 25 can suffice, or a structure having a latch piece added at an intermediate position can be adopted.

The plurality of through holes 11 formed in the body piece 21 are holes into which the convex portions 10 are fitted, and they are arranged at equal intervals in an arc shape with the same curvature as the array of the convex portions 10.

Thus, at the time of restricting swiveling, five convex portions 10 of the anti-swivel plate portion 9 are matched and fitted in five through holes 11 of the swivel brake plate 20.

In the drawings, reference signs 26 and 27 denote slots formed in the first latch pieces 22 and 23, and a length of the up-and-down movement of the swivel brake plate 20 is restricted in a range of a length of each slot with the use of screws fixed to a later-described sidewall of the support base 16.

Figure 1:
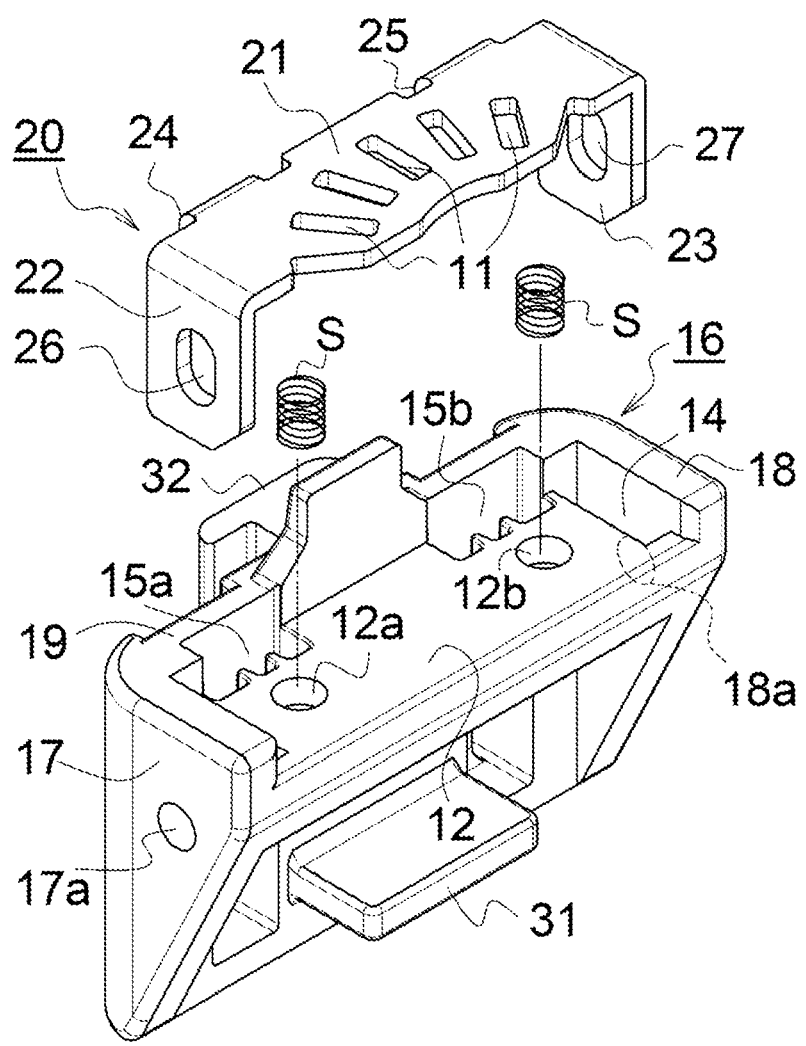
FIG. 1 is an exploded perspective view showing a mounting state of a support base and a swivel brake plate according to Example 1.
Figure 3:
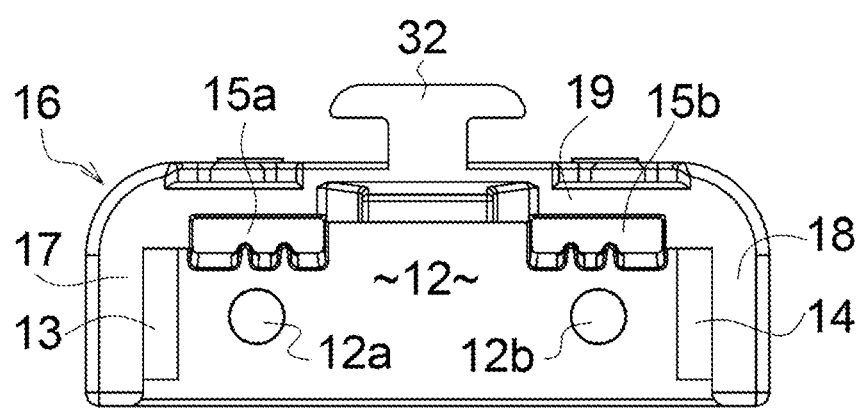
FIG. 3 is a plan view of the support base.

Further, as shown in FIG. 1 and FIG. 3, in the support base 16, an upper surface fitting portion 12 which is surrounded by three walls which are left and right wall portions 17 and 18 on which the swivel brake plate 20 is mounted and a rear wall portion 19 connecting the wall portions 17 and 18 and whose anti-swivel plate portion 9 side is opened is formed.

The upper surface fitting portion 12 is set to a size which enables mounting the body piece 21 of the swivel brake plate 20 thereon.

Furthermore, in the support base 16, first hole portions 13 and 14 having a rectangular cross section into which the first latch pieces 22 and 23 of the swivel brake plate 20 are slidably fitted are formed at positions on the left and right sides of the upper surface fitting portion 12 which are in contact with the left and right wall portions 17 and 18.

In the present invention, the holes having a depth which allows the first latch pieces 22 and 23 to freely vertically slide can suffice, and the holes do not have to be pierced.

Moreover, at intermediate positions on the left and right wall portions 17 and 18, bolt or pin fixing screw holes 17a and 18a which are fixed crossing the first hole portions 13 and 14 and also fixed through the slots 26 and 27 of the first latch pieces 22 and 23 to retain the swivel brake plate 20 are formed.

Likewise, in the support base 16, rectangular second hole portions 15a and 15b into which the second latch pieces 24 and 25 of the swivel brake plate 20 are slidably fitted are formed on left and right sides of a position which is in contact with the rear wall portion 19 at the rear of the upper surface fitting portion 12.

In this example, the second hole portions 15a and 15b are set as holes which are longer than lengths of the second latch pieces 24 and 25 and have a depth which is equal to or larger than a depth which realizes the contact with hole bottom portions when at least the swivel brake plate 20 moves down at the maximum.

It is to be noted that reference signs 31 and 32 denote mounting pieces configured to fix the support base 16 to the support yoke 3.

The upper surface fitting portion 12 of the support base 16 is recessed with a depth which is not smaller than a thickness of the swivel brake plate 20.

In the upper surface fitting portion 12, a pair of left and right receiving holes 12a and 12b configured to support lower ends of coil springs S as an example of the biasing members are formed.

The receiving holes 12a and 12b are preferably set to a depth which enables complete sinking of the compressed coil springs S.

Thus, the first latch pieces 22 and 23 of the swivel brake plate 20 are inserted into the first hole portions 13 and 14 of the support base 16, the second latch pieces 24 and 25 are inserted into the second hold portions 15a and 15b of the support base 16 at the same time, and the body piece 21 is mounted on the upper surface fitting portion 12.

In the upper surface fitting piece 12, lower ends of the pair of left and right coil springs S and S are erected with lower ends thereof fitted in the receiving holes 12a and 12b.

Figure 4:
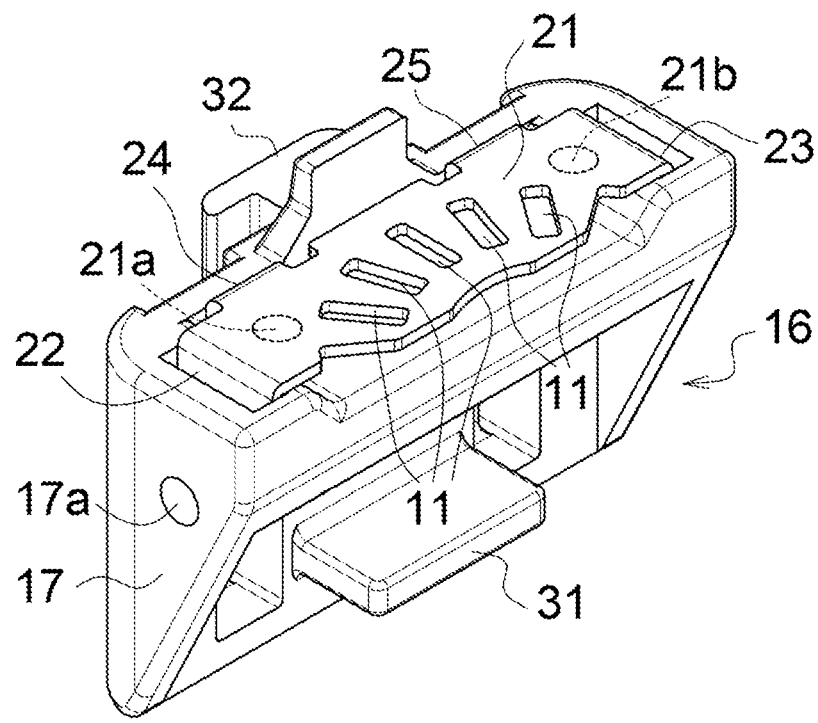
FIG. 4 is a perspective view of a state where the swivel brake plate has been attached to the support base.
Figure 5:
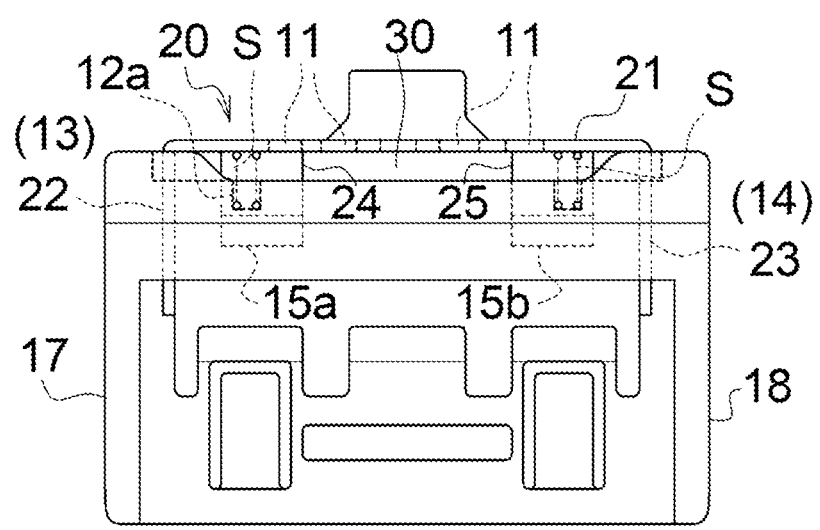
FIG. 5 is a front view of the same.
Figure 7:
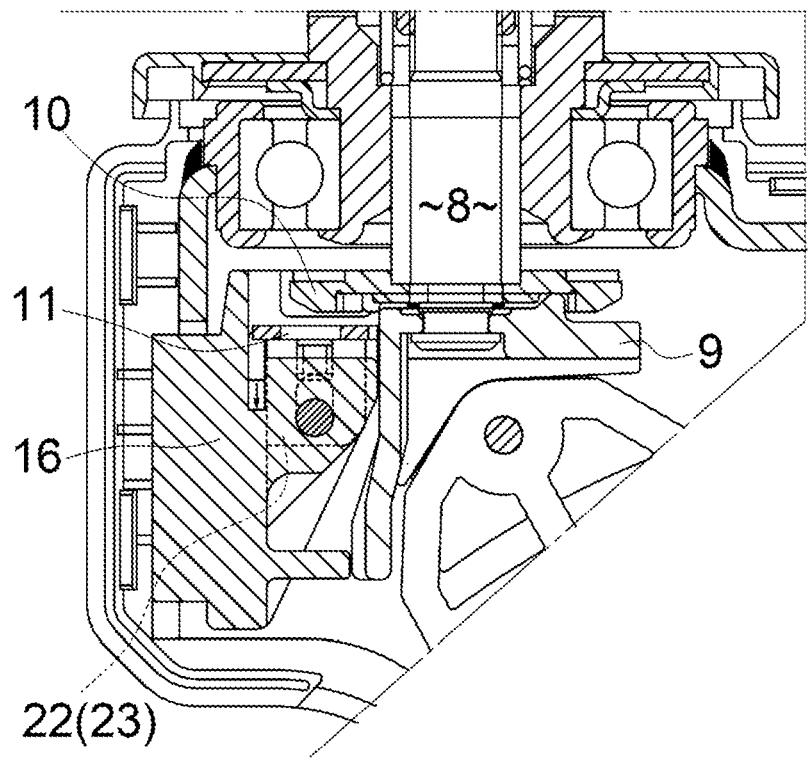
FIG. 7 is an enlarged view of a primary part of a support yoke to which the support base having the swivel brake plate mounted thereto has been attached.

Thus, upper ends of the coil springs S and S abut against a bottom surface of the swivel brake plate 20 so that the swivel brake plate 20 is held at a hollow position (see FIG. 4, FIG. 5, and FIG. 7).

In this example, since the coil springs are used as the biasing members, flat abutting surface portions 21a and 21b against which the upper ends of the coils springs S abut are formed on the bottom surface of the body piece 21 of the swivel brake plate 20 at positions where these portions do not overlap the through holes 11 on the left and right outer sides of a group of the through holes.

The biasing members are not restricted to compression springs, and torsion springs, leaf springs, formed wires, and the like may be used.

Additionally, as the biasing members, block-shaped rubber or the like may be used.

Figure 8:
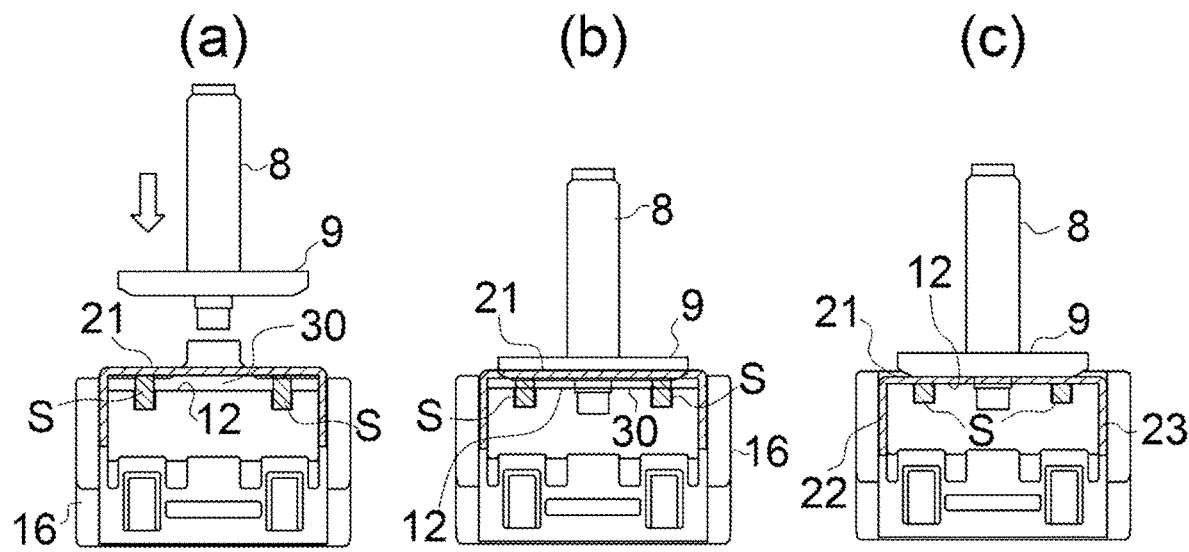
FIG. 8 are explanatory parts showing swivel brake states, where (a) shows a standby state, (b) shows a fitted state, and (c) shows a contact state.

Since the above-described structure is adopted, as shown in FIG. 8(a), at the time of swivel braking, the operation shaft 8 moves down, the anti-swivel plate portion 9 gets closer to the swivel brake plate 20. At this time, the swivel brake plate 20 is still held in a hollow posture by the coil springs S.

Then, when the anti-swivel plate portion 9 moves down, the swivel brake plate 20 is pressed down against the biasing force, the swivel brake plate 20 and the anti-swivel plate portion 9 are integrally constrained upon the fitting of the convex portions 10 into the through holes 11 of the swivel brake plate 20, thereby restricting the caster 1 from swiveling (see FIG. 8(b)).

At this moment, even if the considerable downward force is applied to the swivel brake plate 20, this force is buffered by the coil springs S, and hence a superfluous load is not applied to the body piece 21.

On the other hand, when the convex portions 10 are not matched with the through holes 11 even though the anti-swivel plate portion 9 moves down, the body piece 21 of the swivel brake plate 20 further compresses the coil springs S with the use of the convex portions 10, and the compression continues until the compressed coil springs S completely sink in the receiving holes 12a and 12b.

In this state, since the body piece 21 of the swivel brake plate 20 comes into contact with the flat surface of the upper surface fitting portion 12, the downward force of the anti-swivel plate portion 9 is dispersed to the support base 16 through the body piece 21 and the upper surface fitting portion 12, thereby preventing the body piece 21 from being deformed or damaged (see FIG. 8(c)).

In this state, when the anti-swivel plate portion 9 or the support yoke 3 slightly swivels and the convex portions 10 are matched with and fitted in the through holes 11, a swivel restricting posture shown in FIG. 8(b) is realized.

Figure 9:
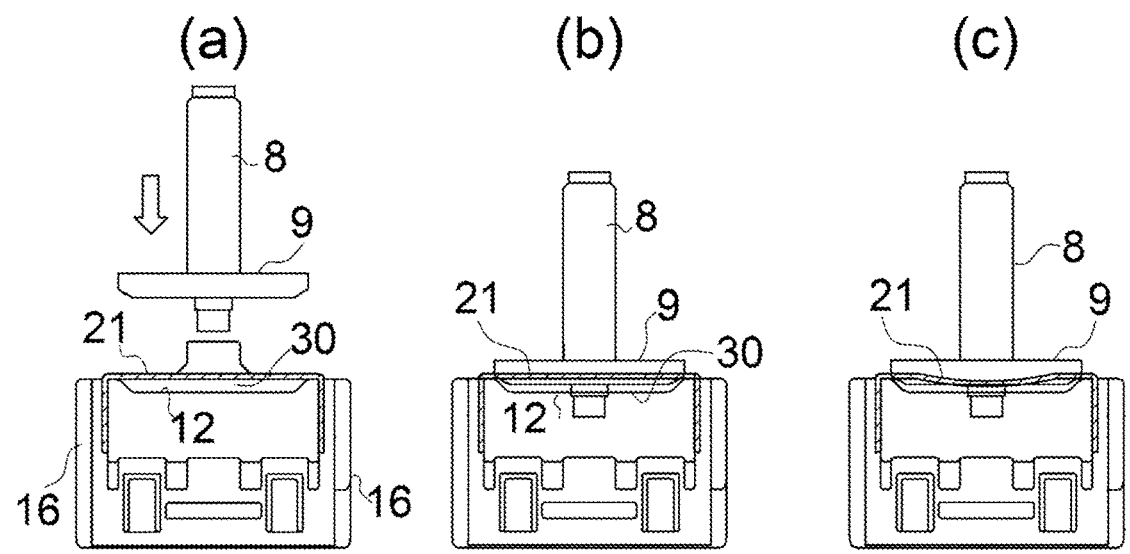
FIG. 9 are explanatory drawings for comparing a state where no coil spring is provided, where (a) shows a standby state, (b) shows a fitted state, and (c) shows a contact state.

On the other hand, when the biasing members, e.g., the coil springs are not provided, the state of FIG. 9(a) is likewise achieved but, at the time of swiveling restriction show in FIG. 9(b), the downward force of the anti-swivel plate portion 9 directly acts on the swivel brake plate 20 without being buffered, and a downward load is applied to the body piece 21.

Further, as shown in FIG. 9(c), when the convex portions 10 are not matched with the through holes 11, the considerable downward force is directly applied to the body piece 21, and the body piece 21 is apt to be deformed toward the gap portion 30 formed between itself and the upper surface fitting portion 12.

As described above, the effects obtained by providing the coil spring are obvious.

The present invention is not restricted to the structure of the foregoing example and, as a matter of course, the design of the present invention can be variously modified without changing a gist of the present invention.

REFERENCE SIGNS LIST 1 swiveling caster
2 wheel
3 support yoke
4 stem
5 rotary shaft 6 cam
7 brake shoe portion
8 operation shaft
9 anti-swivel plate portion
9a upper surface receiving portion
9b lower surface receiving portion
10 convex portion
11 through hole
12 upper surface fitting portion
12a, 12b receiving hole
13, 14 first hole portion
15a, 15b second hole portion
16 support member
17, 18 left or right wall portion
17a, 18a screw hole
19 rear wall portion
20 swivel brake plate
21 body piece
21a, 21b abutting surface portion
22, 23 first latch piece
24, 25 second latch piece
26, 27 slot
30 gap portion
B swivel bearing portion
S coil spring

The invention claimed is:

1. A caster swivel restriction structure comprising: an operation shaft which moves down at a time of braking a swiveling caster and moves up at a time of releasing the braking; an anti-swivel plate portion which is fixed to the operation shaft and has many convex portions annularly arranged on a lower surface thereof; a swivel brake plate comprising a plurality of through holes arranged to enable fitting of some of the convex portions; and a support base portion which supports the swivel brake plate and is fixed to a support yoke of the swiveling caster, wherein the swivel brake plate comprises a body piece having the plurality of through holes arranged therein and latch pieces which downwardly bend from the body piece, the support base comprises latch hole portions into which the latch pieces are vertically slidably fitted and inserted and an upper surface fitting portion provided to face the body piece of the swivel brake plate, biasing members which support the body piece aloft and are downwardly compressible are interposed between the body piece and the upper surface fitting portion, and a gap portion is provided, the swivel brake plate comprises a pair of left and right first latch pieces which bend at both ends of the body piece in an extending direction and second latch pieces which bend on the right and the left of a rear side of the body piece which is a side away from the anti-swivel plate portion, the upper surface fitting portion is surrounded by three walls which are left and right wall portions and a rear wall portion connecting the left wall portion and the right wall portion, the upper surface fitting portion being configured to fit the swivel brake plate thereon, first hole portions into which the pair of first latch pieces of the swivel brake plate are slidably fitted in a vertical direction are formed at positions on left and right sides of the upper surface fitting portion, second hole portions into which the second latch pieces of the swivel brake plate are slidably fitted are formed on left and right sides of a position which is in contact with the rear wall portion, the biasing members are formed of a pair of left and right coil springs, a pair of left and right receiving holes configured to support lower ends of the pair of left and right coil springs are formed in the upper surface fitting portion, the pair of left and right receiving holes being configured to have a depth which enables complete sinking of the pair of left and right coil springs in a compressed state thereof, and upper ends of the pair of left and right coil springs abut against abutting surface portions on a bottom surface of the swivel brake plate, so as to support the swivel brake plate aloft while providing the gap portion to allow for downward compression.

2. The caster swivel restriction structure according to claim 1, wherein a height of the gap portion is set to be not smaller than a length of a stroke of the anti-swivel plate portion when it moves down at the time of the braking.

3. The swivel restriction structure according to claim 1, wherein the abutting surface portions against which the upper ends of the pair of left and right coil springs abut are formed at positions on the body piece of the swivel brake plate on both sides of an extending direction away from positions where the through holes are formed.

4. The swivel restriction structure according to claim 1, wherein the upper ends of the coil springs come into contact with positions on a bottom surface of the body piece of the swivel brake plate away from the through holes, and the lower ends of the pair of left and right coil springs are fitted in holding holes formed in an upper surface portion of the support base where the gap portion is formed.

5. The swivel restriction structure according to claim 4, wherein the abutting surface portions against which the upper ends of the pair of left and right coil springs abut are formed at positions on the body piece of the swivel brake plate on both sides of the extending direction away from positions where the hole portions are formed.

6. The swivel restriction structure according to claim 1, wherein the swivel brake plate is formed of a metal plate, and the support base is made of a hard synthetic resin.

7. The swivel restriction structure according to claim 1, further comprising:

slots formed in the pair of left and right first latch pieces, and screws fixed to sidewalls of the support base so as to restrict a length of an up-and-down movement of the swivel brake plate in a range of a length of each slot.

* * * * *